United States Patent [19]

Ueda et al.

[11] Patent Number: 5,214,323
[45] Date of Patent: May 25, 1993

[54] LINEAR MOTOR WITH REDUCED COGGING

[75] Inventors: Tetuyuki Ueda, Nara; Hiroshi Ishii, Kashihara; Masayoshi Tsunezawa; Masaaki Ozaki, both of Tenri, all of Japan

[73] Assignee: Sharp Kabushiki Kaisha, Osaka, Japan

[21] Appl. No.: 637,282

[22] Filed: Jan. 3, 1991

Related U.S. Application Data

[62] Division of Ser. No. 326,064, Mar. 20, 1989, Pat. No. 5,032,746.

[30] Foreign Application Priority Data

Mar. 22, 1988 [JP] Japan .................. 63-68425

[51] Int. Cl.⁵ .......................... H02K 41/00
[52] U.S. Cl. .................. 310/12; 310/49 R; 318/135
[58] Field of Search ............... 310/12, 49 R, 154, 156, 310/112; 318/135

[56] References Cited

U.S. PATENT DOCUMENTS

| | | | |
|---|---|---|---|
| 4,629,916 | 12/1986 | Oudet | 310/49 R |
| 4,724,350 | 2/1988 | Shiraki et al. | 310/268 |
| 4,739,201 | 4/1988 | Brigham et al. | 310/49 R |
| 5,032,746 | 7/1991 | Ueda et al. | 310/12 |

FOREIGN PATENT DOCUMENTS

| | | | |
|---|---|---|---|
| 2413410 | 10/1975 | Fed. Rep. of Germany . | |
| 2946147 | 5/1980 | Fed. Rep. of Germany . | |
| 3123441 | 7/1982 | Fed. Rep. of Germany . | |
| 209507 | 12/1982 | Japan | 310/12 |
| 58-63074 | 4/1983 | Japan . | |
| 58-75458 | 5/1983 | Japan . | |

OTHER PUBLICATIONS

Copy of European Search Report.

*Primary Examiner*—Steven L. Stephan
*Assistant Examiner*—Judson H. Jones

[57] ABSTRACT

A linear motor is capable of reducing cogging which may be present in the motor. Cogging is an obstruction in realizing constant speed control or high accuracy of position control. The reduction of cogging is accomplished, for example, by pole location or specific detailed shapping of pole iron plates.

10 Claims, 8 Drawing Sheets

Fig. 4(A) When the length of magnetic pole iron plate L is $(n+\frac{1}{2})p$

Fig. 4(B) When the length of magnetic pole iron plate L is np.

LINEAR MOTOR WITH REDUCED COGGING

This application is a divisional of copending application Ser. No. 07/326,064, filed on Mar. 20, 1989, now U.S. Pat. No. 5,032,746 issued Jul. 16, 1991.

BACKGROUND OF THE INVENTION

The present invention generally relates to an electric motor, and more particularly, to a linear motor most suitable for a positioning control, speed control or the like at high accuracy and also, to a linear driving system employing such linear motor.

Conventionally, a linear motor includes a field magnet in which N and S magnetic poles of permanent magnets are alternately arranged, and an armature coil. The motor is structured so as to relatively displace the armature coil or the field magnets by successively changing over the current to be supplied to the armature coil. The linear motor as described above may be classified into two types, the first a coreless type having only an air-core armature coil, and the second a cored type having windings wound onto projecting poles. In the above two types, the coreless type linear motor requires a large-sized stator yoke in order to obtain the field over an entire length of the linear motor, while the other cored type linear motor requires an armature core to form projecting poles for winding the armature coil. Both types having substantial problems for achieving compact size and weight reduction of the linear motors.

Figure 8:
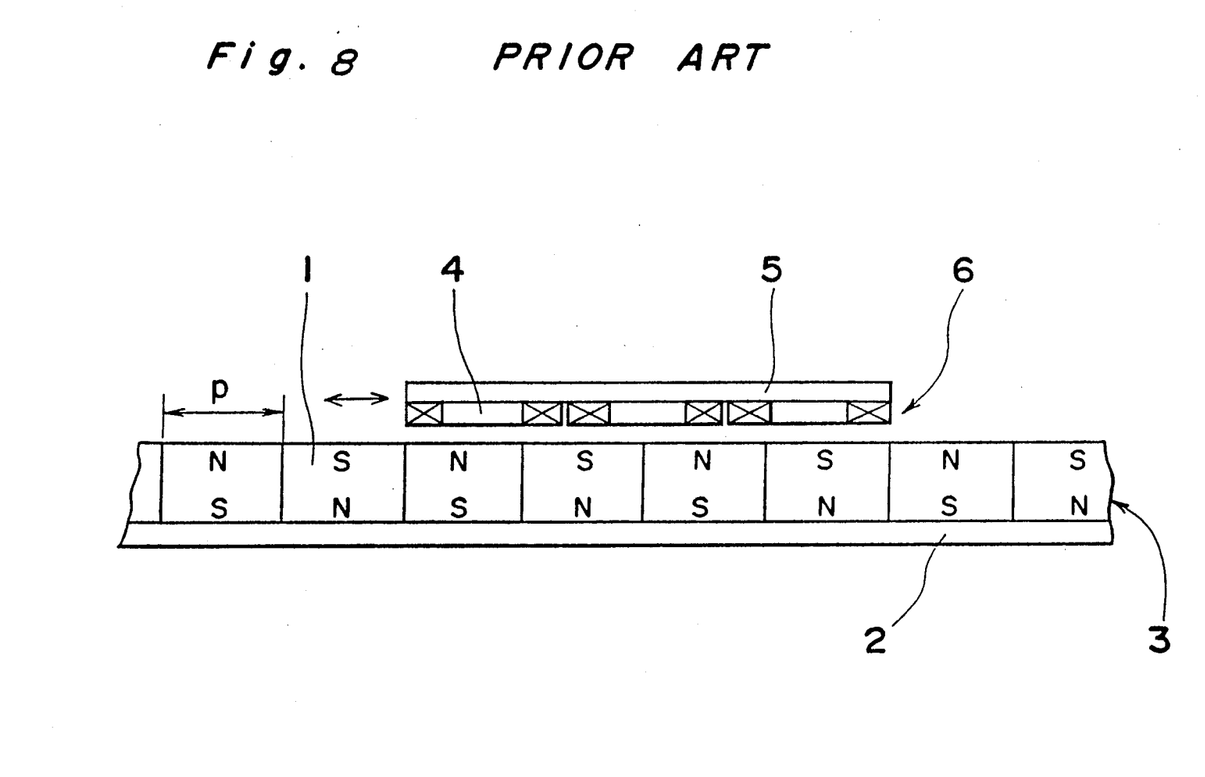
FIG. 8 is a fragmentary side elevational view showing construction of a conventional linear motor (already referred to).

In order to overcome the disadvantages as described above, there has also conventionally been proposed a linear motor as shown in FIG. 8, which includes a movable member 6 having a magnetic pole iron plate 5, polyphase windings 4, and a stator field member 3 having field magnets 1 and a yoke 2, so as to freely move the movable member 6 with respect to the field magnets 1 through polyphase excitation of the polyphase windings 4. In the above known arrangement, as a method of reducing cogging produced in the movable member 6, alleviating the magnetic reluctance variation based on the displacement of the movable member, which a main cause for generation of cogging, is accomplished by devising shapes at the forward ends of the iron plate 5 in a similar manner as in the iron-core type linear motor, thereby to lower cogging generating level.

In the above known arrangement, cogging can not be fully reduced to a permissible level, since the magnetic pole iron plate 5 has the complicated shape at its forward end portions, and high accuracy is required for processing the shape. In other words, cogging becomes a serious cause of disturbance for effecting a constant speed control at high accuracy, while also presenting a large obstruction in the case where positioning control at high accuracy is to be effected.

SUMMARY OF THE INVENTION

An essential object of the present invention is to provide a linear motor capable of sufficiently reducing cogging which may present obstruction in effecting the constant speed control or positioning control at high accuracy.

Another object of the present invention is to provide a linear driving device employing the linear motor of the above described type.

In accomplishing these and other objects, according to one aspect of the present invention, there is provided a linear motor which includes a stator field member having many permanent magnets and a yoke, a movable member having polyphase windings, a magnetic pole iron plate structured to confront the stator field member in a plane, thereby to relatively displace said movable member with respect to said stator field member through polyphase exciting of said polyphase windings. The magnetic pole iron plate has a geometrical shape obtained by dividing said magnetic pole iron plate into two rectangular regions of equal size and configuration with respect to a geometrical center axis in a displacing direction of said linear motor and displacing said rectangular regions in a parallel relation in the forward and backward directions of displacement of the linear motor.

In another aspect of the present invention, there is also provided a linear driving device utilizing linear motors, which comprises a set of two linear motors each including a stator field member having many permanent magnets and a yoke, and a movable member having polyphase windings and a magnetic pole iron plate and disposed to confront said stator field member in a plane, thereby to relatively displace said movable member with respect to said stator field member through polyphase exciting of said polyphase windings. Also included is a rigid structure member connecting, the two movable members in the two liner-motors in the direction of displacement. The two movable members are disposed in a parallel relation to each other, and relative positions of the magnetic poles in said two stator field members corresponding to said two movable members are arranged to be deviated from each other, or to be identical with each other, with relative positions of the two pole iron plates in said two movable members being adapted to be deviated from each other.

In the linear motor for the one aspect, since the phases of the cogging forces acting respectively on the two rectangular regions divided in the magnetic pole iron plate are to be deviated according to the relative positions with respect to the stator field in the two rectangular regions, such cogging forces for the both regions are offset each other.

Meanwhile, with respect to the linear driving device employing the linear motor according to the another aspect, the phases of the cogging forces respectively acting on the two movable members connected to each other by the structure member and disposed in the parallel relation, are to be deviated according to the relative positions of the magnetic poles in the two stator field members, and therefore, such cogging forces for the both are also offset each other. Similar result may be obtained in the case where the relative positions of the magnetic pole iron plates in the two movable members are deviated from each other, with the relative positions of the magnetic poles in the two stator field members being set to be identical.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1A:
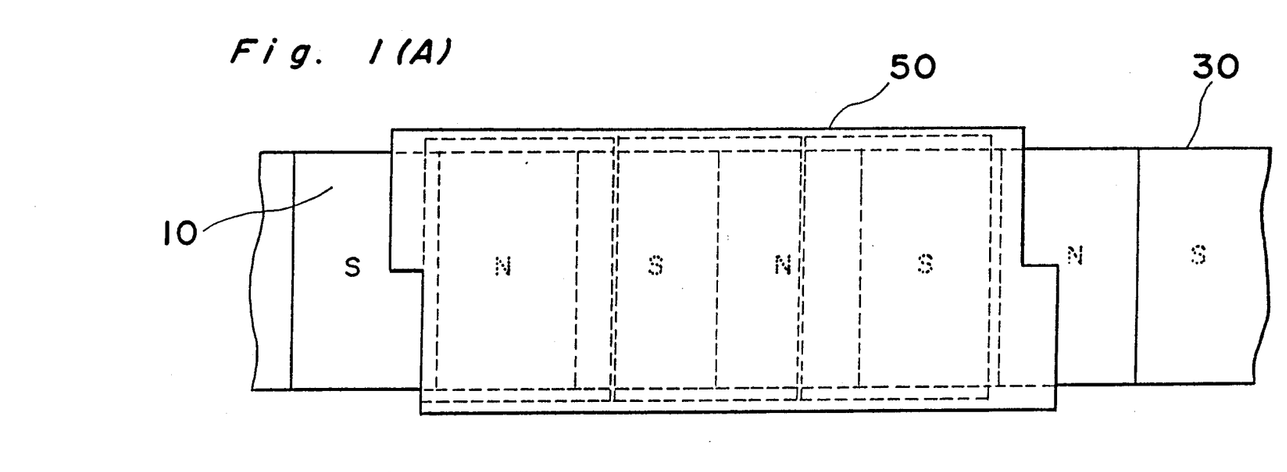
FIG. 1(A) is a fragmentary top plan view of a linear motor according to a first embodiment of the present invention.
Figure 1B:
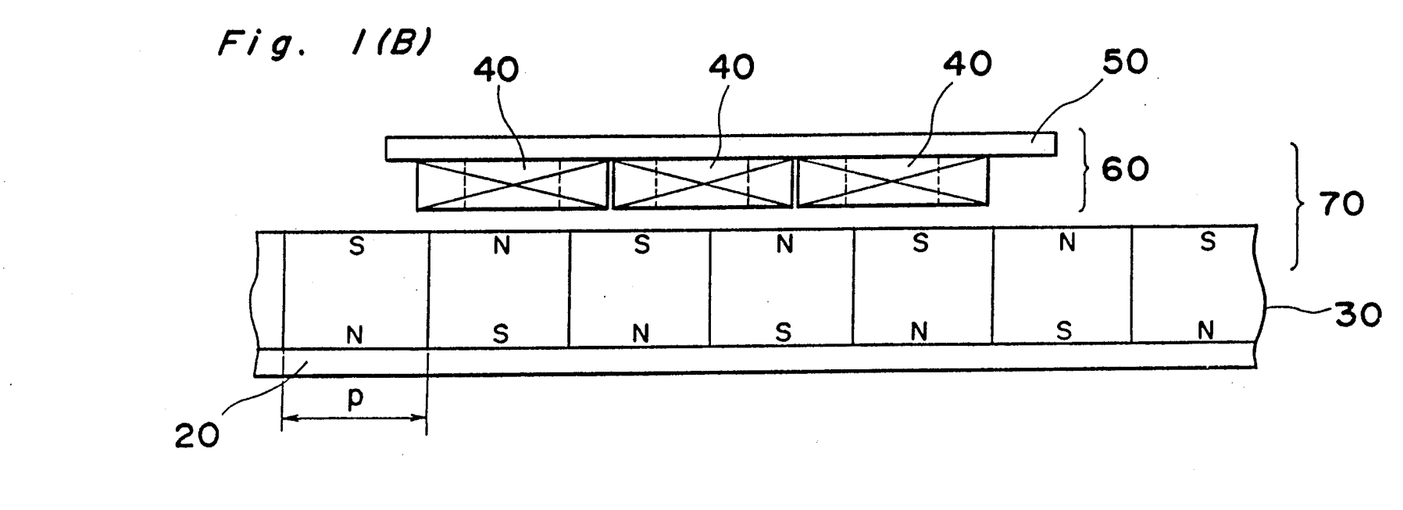
FIG. 1(B) is a schematic side elevational view of the linear motor of FIG. 1(A)

Referring now to the drawings, there is shown in FIGS. 1(A) and 1(B), an improved linear motor 70 according to one preferred embodiment of the present invention, which generally includes a stator field member 30, and a movable member 60 movably provided above the stator field member 30 through a restricted interval therebetween for displacement in the longitudinal direction of said stator field member 30.

The stator field member 30 referred to above is has a plurality of permanent magnets 10 alternately magnetized with N and S poles and a yoke 20, while the movable member 60 further includes polyphase windings 40 provided with a plurality of armature coils and a magnetic pole iron plate 50 supporting said polyphase windings. In other words, the linear motor 70 constituted by the movable member 60 and the stator field member 30 as described above is arranged to displace the movable member 60 with respect to the stator field member 30 by successively exciting the polyphase windings 40.

Figure 2A:
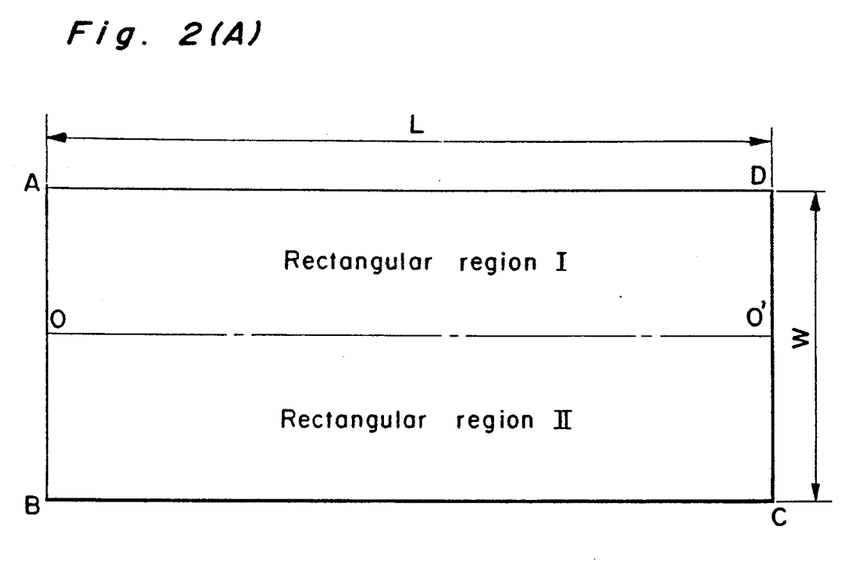
FIG. 2(A) is a top plan view showing a geometrical configuration of a rectangular type magnetic pole iron plate, in the case where the length L thereof is (n+½) times the magnetic pole pitch p.
Figure 2B:
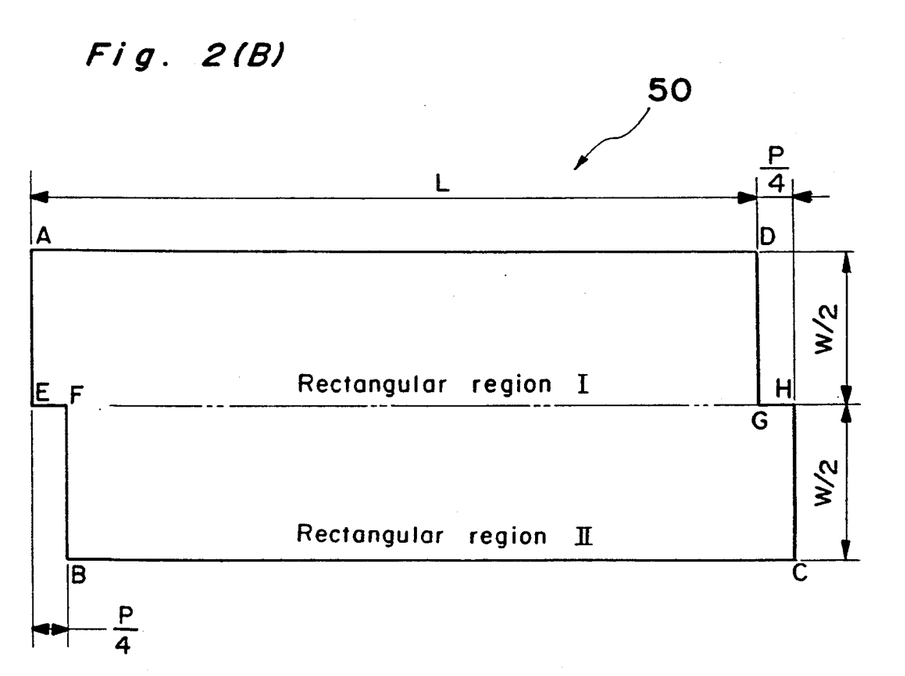
FIG. 2(B) is a view similar to FIG. 2(A), which particularly shows a geometrical configuration of an indented type magnetic pole iron plate, in the case where the length L thereof is (n+½) times the magnetic pole pitch p.

More specifically, the magnetic pole iron plate 50 employed in the above embodiment has an indented shape as shown in FIG. 2(B). On the assumption that a magnetic pole iron pate having a length L and a width W as shown in FIG. 2(A) is divided into a rectangular region I (a rectangle AOO'D) and a rectangular region II (a rectangle OBCO') of the equal size and shape with respect to a geometrical central axis OO' thereof (i.e. a central axis for dividing the magnetic pole iron plate into two portions in a direction of the width), the magnetic pole iron plate 50 in the first embodiment has a geometrical shape in which the rectangular regions I and II are parallelly displaced from each other. In short, the magnetic pole iron plate 50 is divided into the rectangular region I (rectangle AEGD) and the rectangular region II (rectangle FBCH) which are parallelly displaced from each other so as to be in the indented shape on the whole as shown in FIG. 2(B). The length L and the parallel displacing amount are set in the manner as represented by following equations $$L = [n + (\tfrac{1}{2})]p$$

$$EF = GH = (p/4)$$

where n is a natural number and p is a magnetic pole pitch for the permanent magnets 10.

Figure 4A:
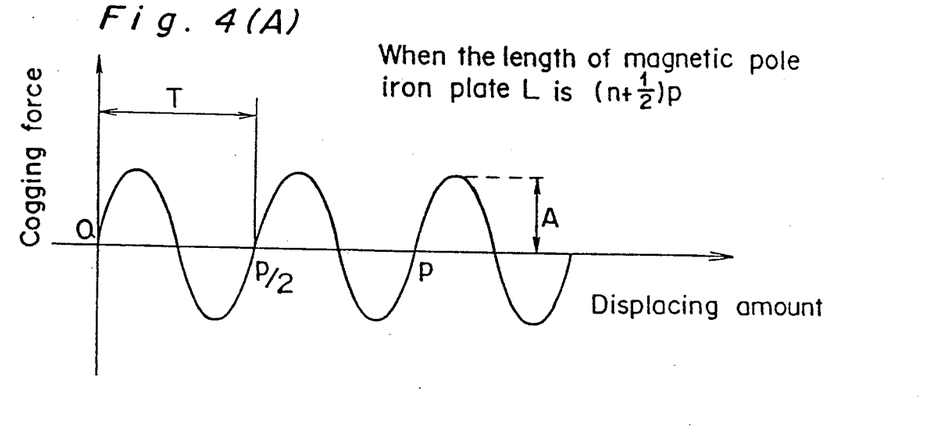
FIGS. 4(A) and 4(B) are graphs showing relation between displacing amounts of the rectangular type magnetic pole iron plate and cogging forces acting thereon when said iron plate is displaced from a reference position.

Subsequently, the principle for reducing cogging by the linear motor having the construction as described so far will be described with reference to a graph of FIG. 4(A) showing relation between the displacing amount and cogging force acting on the magnetic pole iron plate in the case where the rectangular magnetic pole iron plate is displaced from a reference position, and also to a graph of FIG. 4(C) denoting relation between the length L of the magnetic pole iron plate and peak value of the cogging force.

Cogging takes place in association with a large variation of magnetic reluctance in the vicinity of alternate magnetic pole boundary of the stator field member 30 when the magnetic pole iron plate 50 passes therethrough, and in the case where the magnetic pole iron plate has a geometrical configuration in the rectangular shape, the cogging force approximated by a sine wave with an amplitude A and cycle T is acting as shown in FIG. 4(A). Such amplitude A and cycle T may be determined by a magnetomotive force U of the permanent magnets 10, the length L and width W of the magnetic pole iron plate, and the magnetic pole pitch p, and the level of the cogging force becomes minimum when the length L of the magnetic pole iron plate is represented by $[n+(\tfrac{1}{2})]p$ as shown in FIG. 4(C). It is to be noted here that, in the cogging forces acting on the rectangular magnetic pole iron plate, those respectively acting on the rectangular regions I and II as shown in FIG. 2(A), are of the same phase and waveform.

Meanwhile, although the cogging force acting on the indented magnetic pole iron plate 50 is produced as a result of combination of the cogging forces acting respectively on the rectangular regions I and II as shown in FIG. 2(B), since the relative position of the rectangular regions I and II with respect to the stator field member 30 is deviated by p/4 in this case, the cogging forces acting on the both are to be offset each other, with a difference only in phase, and consequently, the level of the cogging is to be lowered. Furthermore, in the case where the length L of the magnetic pole iron plate 50 is represented by $[n+(\tfrac{1}{2})]p$, and the parallel displacing amount for the rectangular regions I and II is denoted by p/4, both of the cogging forces are to be offset each other, and thus, optimum result may be achieved.

Figure 3A:
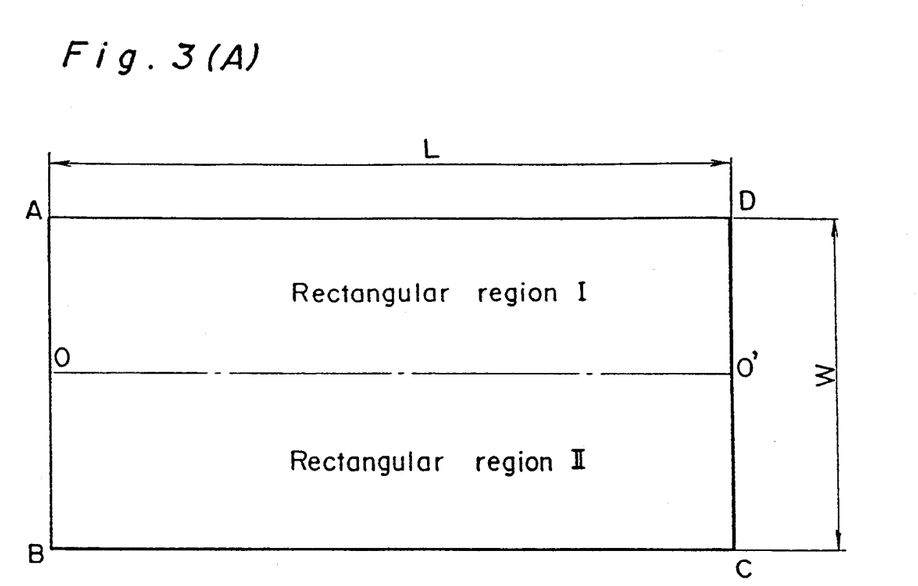
FIG. 3(A) is a top plan view showing a geometrical configuration of a rectangular type magnetic pole iron plate, in the case where the length L thereof is (n) times the magnetic pole pitch p.
Figure 3B:
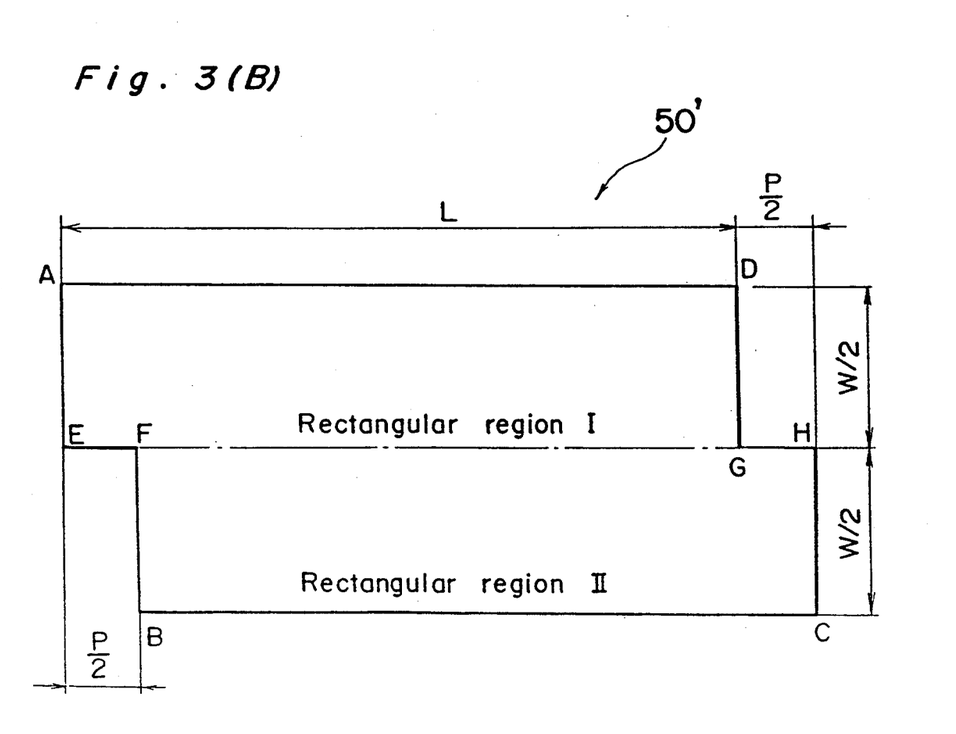
FIG. 3(B) is a view similar to FIG. 3(A), which particularly shows a geometrical configuration of an indented type magnetic pole iron plate, in the case where the length L thereof is (n) times the magnetic pole pitch p.

Referring further to FIGS. 3(A) and 3(B), a modification of the linear motor and the linear driving device employing the linear motor according to the present invention will be described hereinbelow.

The construction of the linear motor 70 to which the magnetic pole iron plate according to the modification of the present invention may be applied is generally the same as that described with reference to FIGS. 1(A) and 1(B), and therefore, detailed description thereof is abbreviated here for brevity.

The modified magnetic pole iron plate 50' employed in the linear motor of the present invention has an indented shape as shown in FIG. 3(B). On the assumption that a magnetic pole iron pate having a length L and a width W as shown in FIG. 3(A) is divided into a rectangular region I (a rectangle AOO'D) and a rectangular region II (a rectangle OBCO') of the equal size and shape with respect to a geometrical central axis OO' thereof (i.e. a central axis for dividing the magnetic pole iron plate into two portions in a direction of the width), the magnetic pole iron plate 50' of the modification has a geometrical shape in which the rectangular regions I and II are parallelly displaced from each other. In short, the magnetic pole iron plate 50 is divided into the rectangular region I (rectangle AEGD) and the rectangular region II (rectangle FBCH) which are parallelly displaced from each other so as to be in the indented shape on the whole as shown in FIG. 3(B). The length L and the parallel displacing amount are set in the manner as represented by following equations $$L = np$$

$$EF = GH = (p/4)$$

where n is a natural number and p is a magnetic pole pitch for the permanent magnets 10.

Figure 4B:
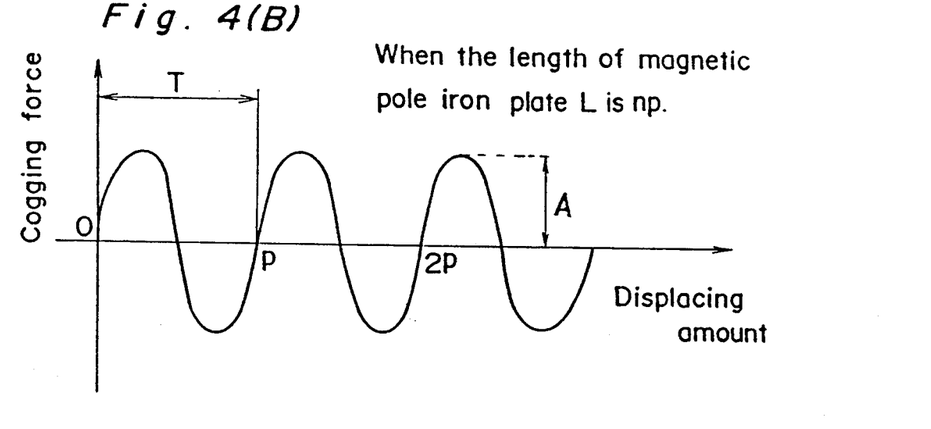
Figure 4C:
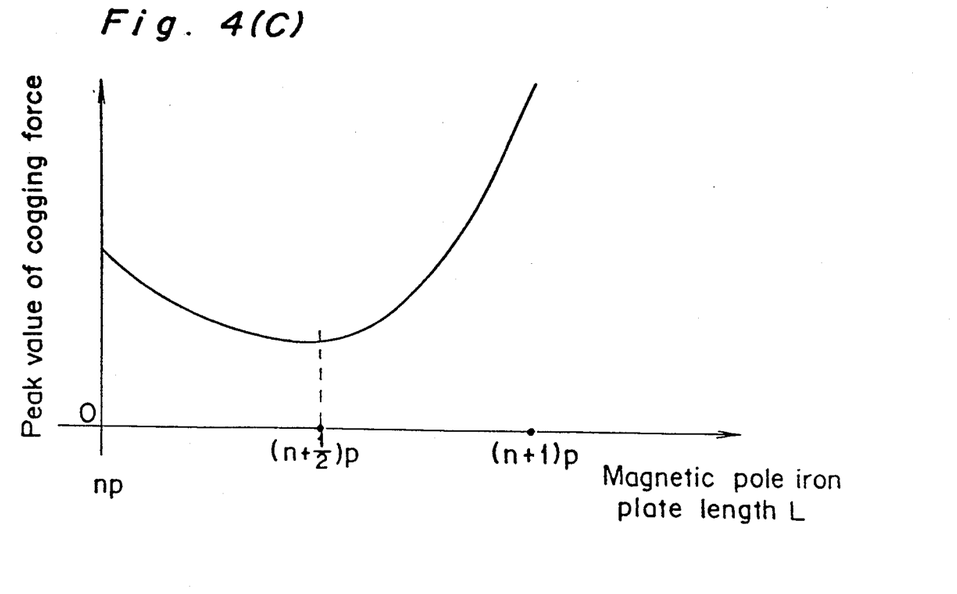
FIG. 4(C) is a graph showing relation between a length L of the magnetic pole iron plate and a peak value of cogging force.

Subsequently, the principle for reducing cogging by the linear motor having the construction as described so far will be described with reference to a graph of FIG. 4(B) showing relation between the displacing amount and cogging force acting on the magnetic pole iron plate in the case where the rectangular magnetic pole iron plate is displaced from a reference position.

Cogging takes place in association with a large variation of magnetic reluctance in the vicinity of alternate magnetic pole boundary of the stator field member 30 when the magnetic pole iron plate 50' passes therethrough, and in the case where the magnetic pole iron plate has a geometrical configuration in the rectangular shape, the cogging force approximated by a sine wave with an amplitude A and cycle T is acting as shown in FIG. 4(B). It is to be noted here that, in the cogging forces acting on the rectangular magnetic pole iron plate, those respectively acting on the rectangular regions I and II as shown in FIG. 3(A), are of the same phase and waveform.

Meanwhile, although the cogging force acting on the indented magnetic pole iron plate 50' is produced as a result of combination of the cogging forces acting respectively on the rectangular regions I and II as shown in FIG. 3(B), since the relative position of the rectangular regions I and II with respect to the stator field member 30 is deviated by p/4 in this case, the cogging forces acting on the both are to be offset each other, with a difference only in phase, and consequently, the level of the cogging is to be lowered.

Figure 5:
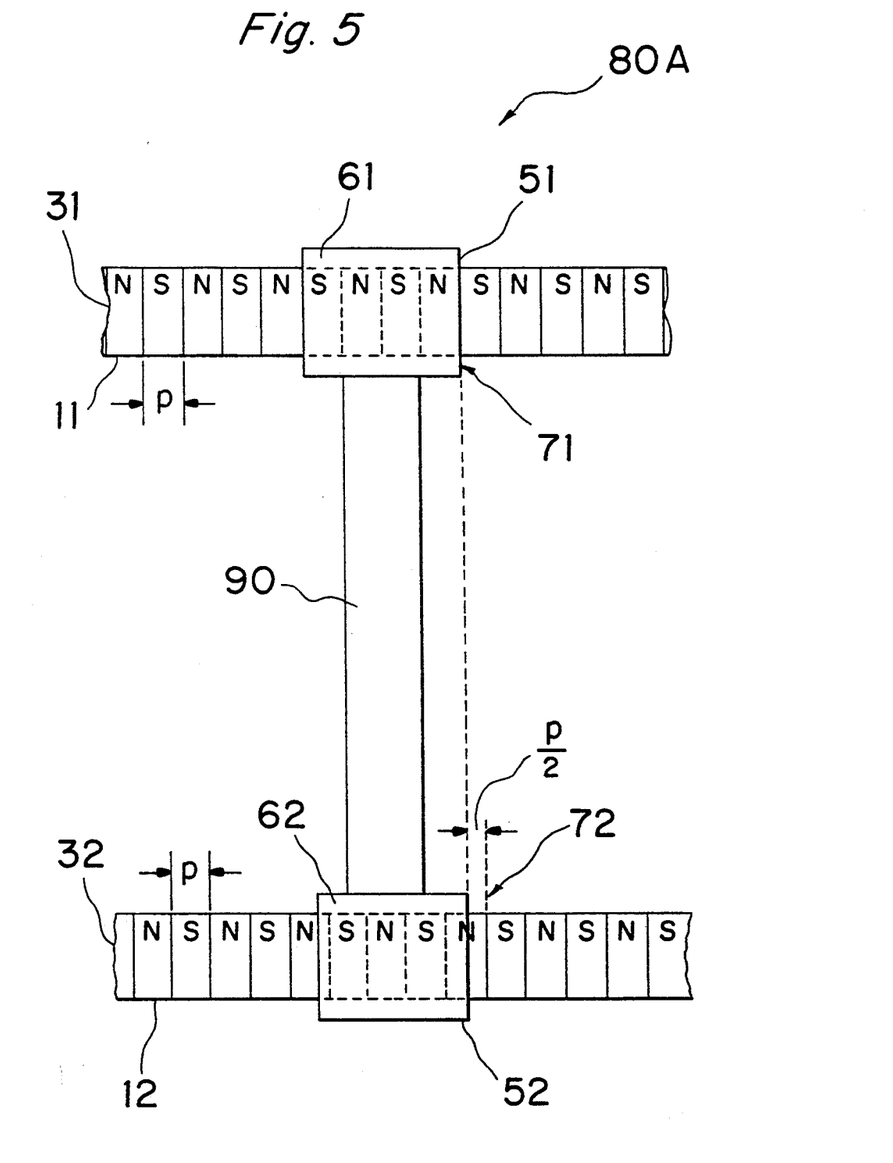
FIG. 5 is a schematic top plan view showing a general construction of a linear driving device employing the linear motors according to the present invention.
Figure 6:
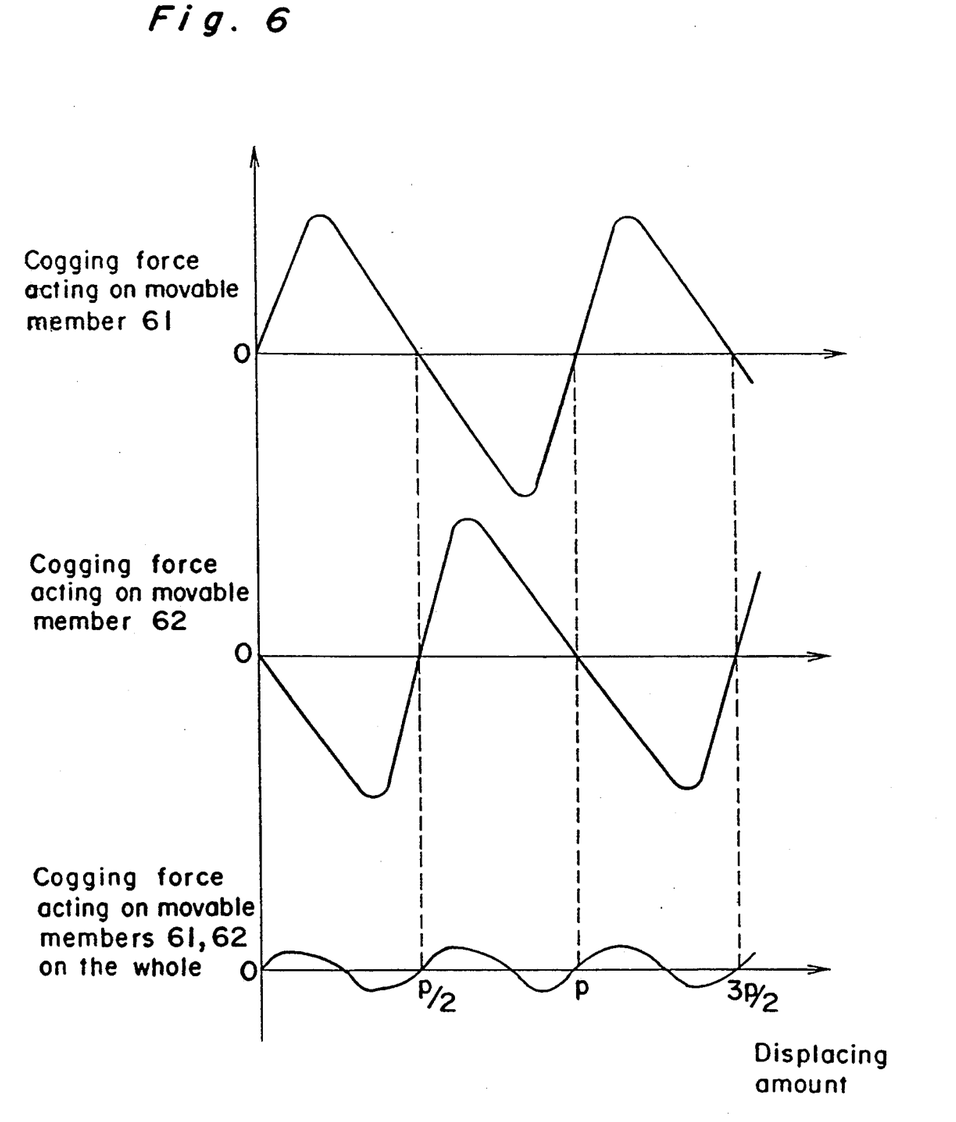
FIG. 6 is a graph showing relation between the displacing amounts of the movable members from a reference position and the cogging forces acting on the respective movable members.

Referring further to FIGS. 5 and 6, a linear driving device employing the linear motor according to the present invention will be described hereinafter.

In FIG. 5, the linear driving device 80A generally includes two linear motors 71 and 72 disposed in a parallel relation to each other, and movable members 61 and 62 connected to each other by a structure member 90 having a rigidity and adapted to be freely displaced. The linear motor 71 is fundamentally constructed by a stator field member 31 having permanent magnets 11 alternately magnetized by N and S poles and a yoke (not shown), and the movable member 61 having a rectangular magnetic pole iron plate 51 and polyphase windings (not shown). Although the other linear motor 72 is similarly constituted by a stator field member 32 having permanent magnets 12 alternately magnetized by N and S poles and a yoke (not shown) and the movable member 62, the relative positions between the permanent magnets 11 and 12 are deviated by p/2. It is to be noted that the magnetic pole iron plates 51 and 52 for the linear motors 71 and 72 are equal to the magnetic pole iron plate as shown in FIG. 3(A).

Referring also to FIG. 6, principle for reducing cogging in the linear driving device having the construction as described so far will be explained hereinafter.

In short, owing to the construction that the relative positions of the permanent magnets 11 and 12 are deviated by p/2, the cogging forces respectively acting on the movable members 61 and 62 will be in opposite phases. Moreover, since the movable members 61 and 62 are connected to each other by the structure member 90, the cogging forces acting on the both are to be cancelled, and consequently, the cogging produced on the movable members 61 and 62 are remarkably reduced.

Figure 7:
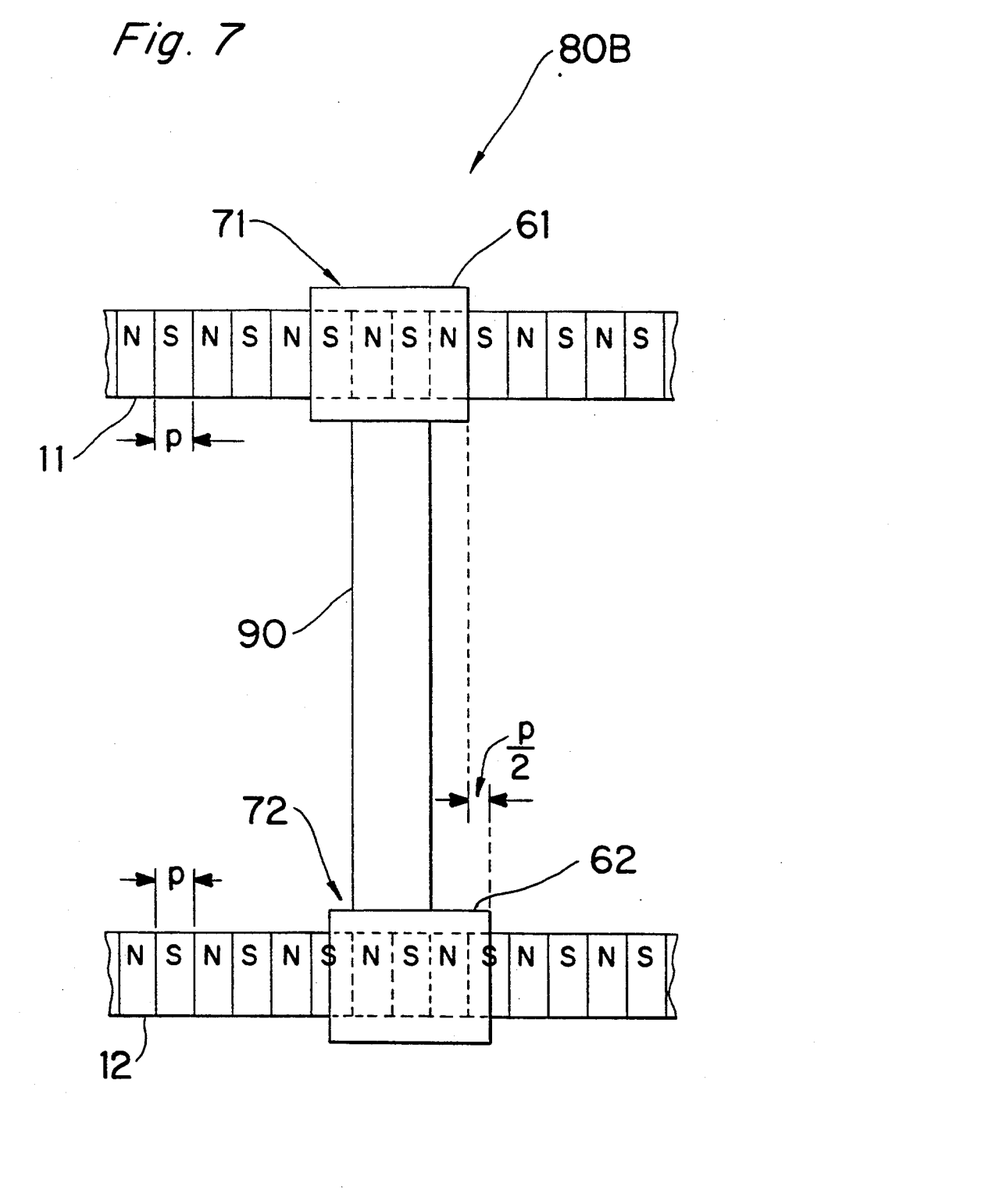
FIG. 7 is a view similar to FIG. 5, which particularly shows a modification thereof.

It should be noted here that the arrangement in the foregoing embodiment in which the relative positions of the permanent magnets 11 and 12 are deviated by p/2 may be so modified as in a modification of FIG. 7 in which the relative positions of the movable members 61 and 62 are deviated by p/2 so as to obtain a similar effect.

Accordingly, by the linear motor and the linear driving device employing said linear motor of the present invention as described so far, generation of cogging may be advantageously reduced through a simple method for practical applications, and therefore, the present invention is particularly significant in that disturbance in control systems can be markedly reduced in the case where a constant speed control or positioning control is to be effected at higher accuracy, with an attempt for small size and light weight.

It should also be noted here that the linear motor and the linear driving device of the present invention are not limited to the foregoing embodiments, but may further be modified in various ways within the scope, for example, in such a manner that, by connecting both movable members including indented type magnetic pole iron plates through a structure member, the relative positions of these movable members and the permanent magnets in the stator field members are deviated.

As is clear from the foregoing description, according to the linear motor and the linear driving device utilizing said linear motor of the present invention, since the system in which the cogging forces acting on the movable members are cancelled on the whole is employed, instead of the system for alleviating the magnetic reluctance variation based on the displacement of the movable members which is the main cause of cogging generation, and moreover, said system may be effected comparatively easily through alteration of the configuration of the magnetic pole iron plate o variation of relative position between the permanent magnets in the fixed stator field members and the movable members, cogging may be sufficiently reduced down to a permissible level consequently. Therefore, it becomes possible to realize a very superior servo-motor for effecting positioning control or speed control at high accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A linear driving device utilizing linear motors, which comprises:
    a set of two linear motors each linear motor including a stator field member having a plurality of permanent magnets and a yoke, and a movable member having polyphase windings and a magnetic pole iron plate and disposed to confront said stator field member in a plane, thereby to relatively displace said movable member with respect to said stator field member through polyphase exciting of said polyphase windings;
    a rigid structure member connecting, the two movable members in the two linear motors disposed in the direction of displacement, said two movable members being disposed in a parallel relation to each other; and relative positions of the magnetic poles in one of said stator field members of one motor being offset from magnetic poles in the stator field member of the second motor.

2. A linear driving device utilizing linear motors, which comprises:
    a set of two linear motors each including a stator field member having a plurality of permanent magnets and a yoke, and a movable member having polyphase windings and a magnetic pole iron plate and disposed to confront said stator field member in a plane, thereby to relatively displace said movable member with respect to said stator field member through polyphase exciting of said polyphase windings;
    a rigid structure member connecting, the two movable members in the two linear motors disposed in the direction of displacement, said two movable members being disposed in a parallel relation to each other, with relative positions of the magnetic poles in said two stator field members corresponding to said two movable members being arranged to be identical; and
    a magnetic pole iron plate in a movable member on one of said motors being offset from a magnetic pole iron plate in said movable member of a second motor.

3. The apparatus of claim 1, wherein said poles are offset by a value of P/2 wherein P is a pole pitch.

4. The apparatus of claim 3, wherein said linear direction represents a forward and backward direction of a displacement of said linear motor.

5. The apparatus of claim 2, wherein said iron plates are offset from each other by a value of P/2 wherein P is a pole pitch.

6. The apparatus of claim 5, wherein said linear direction represents a forward and backward direction of a displacement of said linear motor.

7. A linear driving apparatus comprising:
    two linear motors located substantially parallel to each other;
    each of said motors including a stator field member having a plurality of permanent magnets and a movable member having windings, a magnetic pole iron plate in operative relationship to said stator field member functioning to relatively displace said movable member with respect to said stator field member through polyphase exciting of said windings;
    a rigid structure member connecting each movable member which are spaced in parallel relation to each other in the two linear motors;
    each of said movable members providing cogging of opposite phases;
    means for substantially cancelling the cogging forces, wherein said movable member of each motor includes a leading and trailing edge, the leading and trailing edge of the movable member of each motor in alignment with each other respectively.

8. A linear driving apparatus comprising:
    two linear motors located substantially parallel to each other;
    each of said motors including a stator field member having a plurality of permanent magnets and a movable member having windings, a magnetic pole iron plate in operative relationship to said stator field member functioning to relatively displace said movable member with respect to said stator field member through polyphase exciting of said windings;
    a rigid structure member connecting each movable member which are spaced in parallel relation to each other in the two linear motors;
    each of said movable members providing cogging of opposite phases;
    means for substantially canceling the cogging forces, wherein the magnets of each of said motors has side edges adjacent to side edges of another magnet, and the side edges of the magnets of one motor being in alignment with the side edges of the magnets of the other motor.

9. The apparatus of claim 7 wherein the magnets of each of said motors has side edges adjacent to the side edges of another magnet and said means includes at least the side edges of at least on of said plurality of magnets of each of said motors being offset from each other.

10. The apparatus of claim 8 wherein the movable member of each of said motors having leading and trailing edges and said means includes the leading and trailing edges of said movable members being offset from each other.

* * * * *